(12) United States Patent
Duncan

(10) Patent No.: US 6,755,215 B2
(45) Date of Patent: Jun. 29, 2004

(54) TEAR-OUT COUPLING WITH PUNCTURE MEANS

(76) Inventor: Scott Duncan, 3515 Plaintain Ct., Santa Rosa, CA (US) 95403

(*) Notice: Subject to any disclaimer, the term of this patent is extended or adjusted under 35 U.S.C. 154(b) by 0 days.

(21) Appl. No.: 09/992,806

(22) Filed: Nov. 13, 2001

(65) Prior Publication Data

US 2002/0149156 A1 Oct. 17, 2002

Related U.S. Application Data

(63) Continuation of application No. 09/401,252, filed on Sep. 23, 1999.
(60) Provisional application No. 60/101,758, filed on Sep. 25, 1998.

(51) Int. Cl.$^7$ .............................. F16L 55/10; F16K 17/40
(52) U.S. Cl. ........................ 138/90; 138/89; 137/68.3; 73/49.8
(58) Field of Search ................ 138/90, 89; 73/49.8, 73/49.1, 49.5, 46; 277/917, 609, 626, 627; 137/68.19, 68.27, 68.3

(56) References Cited

U.S. PATENT DOCUMENTS

| | | | | | |
|---|---|---|---|---|---|
| 4,376,597 | A | * | 3/1983 | Britton et al. | 405/195.1 |
| 4,429,568 | A | * | 2/1984 | Sullivan | 73/49.8 |
| 4,602,504 | A | * | 7/1986 | Barber | 138/89 |
| 4,706,482 | A | * | 11/1987 | Barber | 73/49.8 |
| 4,936,350 | A | * | 6/1990 | Huber | 138/90 |
| 5,033,510 | A | * | 7/1991 | Huber | 137/68.19 |
| 5,507,501 | A | * | 4/1996 | Palmer | 277/602 |
| 6,032,515 | A | * | 3/2000 | Huber | 138/90 |
| 6,082,183 | A | * | 7/2000 | Huber | 137/254 |
| 6,085,363 | A | * | 7/2000 | Huber | 138/90 |
| 6,209,584 | B1 | * | 4/2001 | Huber | 138/89 |

* cited by examiner

Primary Examiner—Patrick Brinson

(57) ABSTRACT

A unitary removable barrier for installation in a cylindrical water line to selectively block the water line to passage of water therethrough. The unitary removable barrier is composed of a single piece body having at least one cylindrical section sized to receive upstream and downstream pipes of the water line. A unitary planar disk is molded with the cylindrical section and is of a circular circumference which completely blocks the water line when in place but which is selectively removable from the cylindrical section thus removing the barrier to the passage of water through the line.

6 Claims, 2 Drawing Sheets

TEAR-OUT COUPLING WITH PUNCTURE MEANS

RELATED PATENT APPLICATIONS & INCORPORATION BY REFERENCE

This application is a continuation application of U.S. Ser. No. 09/401,252, filed Sep. 23, 1999, which is a utility patent application based on provisional patent application U.S. Ser. No. 60/101,758, filed Sep. 25, 1998. If any conflict arises between the disclosure of the invention in the utility applications and that in the related provisional application, the disclosure in the utility applications shall govern. These related applications are incorporated herein by reference and made a part of this application. Moreover, the inventor incorporates herein by reference any and all U.S. patents, U.S. patent applications, and other documents cited or referred to in this application or cited or referred to in the U.S. patents and U.S. patent applications incorporated herein by reference.

TECHNICAL FIELD OF INVENTION

The present invention deals with a unitary removable barrier for installation in a cylindrical water line for temporarily blocking the passage of water through the line. When plumbing a structure such as a house intended to carry water, the structure goes through several waste line tests to confirm the integrity of the various plumbing joints. This requires temporarily blocking the waste line so that the water lines within the structure can be filled and leaks detected. The present invention involves an improved means of temporarily blocking the water waste line in order to create a suitable water head to conduct such testing.

BACKGROUND OF THE INVENTION

When plumbing a structure such as a house, the structure is subjected to at least two different waste water tests. A first test is intended to determine the integrity of the water lines at ground or slab by filling the structure's waste lines with water to create a pressure head. A second test is conducted at "top-out" meaning that after the structure is vented and tubs, sinks and other fixtures are installed, the waste lines are again filled with water to create yet another pressure head. Under pressure, the various lines are inspected for leakage prior to the installation of sheetrock which would obviously mask the detection of any leakage.

As background, plumbers are required to "stub out" or create an external waste line outlet two or three feet from the perimeter of the structural foundation. The "stub out" line is typically capped off in order to run the above-described water tests. There are a variety of currently available caps designed to accomplish this task. For example, a plumber may employ a rubber cap with a stainless steel band. However, a rubber cap is prone to being blown off of the "stub out" if subjected to sufficient water head pressure. In order to prevent this from occurring, the plumber will oftentimes drive a wooden stake in front of the rubber cap. This entails a good deal of additional effort and is not particularly effective in preventing blow-off. As an alternative, a plumber may glue the plastic test cap to the "stub out" which can be knocked off after the test has been conducted. However, this requires applying and setting a suitable adhesive which obviously must later be removed once the test has been completed. At removal, the plumber is likely to get quite wet as the water head pressure is released. There are additional problems associated with caps employed at "stub out." For example, when a sewer line to the street or septic is about to be connected, the plumber is oftentimes not the party responsible for making the connection. If someone else makes the connection who is unfamiliar with this process, the cap will be cut off or otherwise removed releasing the water head within the structure perhaps prematurely before the plumber has had an opportunity to check the structure for leaks. Even if the plumber is the party responsible for connecting the sewer line to the "stub out," he may still be forced to release his test and then recap the line after the connection has been made thus requiring that the water head be reestablished. This is time-consuming and also is a waste of water. Ideally, the plumber would like to maintain a water head throughout the sheetrock process so that any accidental nailing into the waste line would be visible by observing water leakage.

In addition to the above, once the sewer has been connected, it is traditional for the plumber to return to the project to reset his waste lines at which point a plumber employs a wye, a one-eighth bend and a clean-out plug at the point where the sewer has been connected. A plumber typically employs a long test ball which is inserted into the one-eighth band and wye and is inflated at the appropriate position. The test ball is intended to temporarily block the waste line to again create a suitable pressure head within the structure. However, these test balls are extremely expensive and by reducing pressure within the test ball, they can be removed and oftentimes stolen from the job site. Further, they can inadvertently lose air, slip down the line and cause a major stoppage which must be dealt with by excavating and exposing the sewer line. The air balls, which exhibit external ribs, crack after repeated usage and tend to leak under tests. Leakage from the side wall of the test ball as well as from its air stem obviously results in water leakage to the sewer and reduction of water head thus reducing the effectiveness of the test.

One way of dealing with this issue has been disclosed in U.S. Pat. No. 5,507,501. The invention disclosed in the '501 patent is to a disk-shaped sealing device which is molded as an integral, unitary piece. The sealing device comprises a circular disc and an angled flange extending outwardly and upwardly from the perimeter of the circular disc. The disc-shaped device fits snugly within a barrel of a plastic fitting such that the circular disc is coaxially received in the barrel of the plastic fitting and the angled flange mates with and lies against a bevel in the barrel of the plastic fitting. A lug extends downwardly from the circular disc whereby first and second elongate grooves are formed in one of the surfaces of the disc. It is taught that the disc-shaped device can be ripped out of the barrel of the fitting so as to remove the device in its entirety from the fitting by pulling on the lug and ripping the circular disc along the first and second grooves in a spiral ripping motion that ultimately pulls the circular disc and the angled flange from the fitting.

Although the invention disclosed in the '501 patent constitutes a dramatic improvement over devices of the prior art described above, it, itself, is not without its limitations. Specifically, the disc-shaped sealing device must be employed only in a waste line which will accept an angled flange. As such, the device cannot be used when a water line is provided with a consistent and uniform interior diameter throughout its length. In addition, the disc-shaped sealing device must, itself, be sealed to the receiving ledge or flange of a waste line to ensure that the disc remains in sealing engagement with the water line during tests. This requires either the use of a glue or wax to ensure that the disc-shaped sealing device remains in place. It is hypothesized that these limitations have prevented the device described in the '501 patent from being universally accepted in the plumbing trade.

It is thus an object of the present invention to provide a means of temporarily blocking a "stub out" or water line which can effectively and temporarily prevent passage of water through the waste line thus creating a suitable pressure head within the structure while being easily removable from the waste line and while addressing all of the drawbacks recited above.

These objects will be more readily apparent when considering the following disclosure and appended drawings.

SUMMARY OF THE INVENTION

The present invention is directed to a unitary removable barrier for installation in a cylindrical water line to selectively block the water line to the passage of water therethrough. The unitary removable barrier is composed of a one piece body of, for example, rubber or plastic, having at least one cylindrical section having at least one cross-sectional area, longitudinal axis and sized to receive an upstream pipe and downstream pipe of the water line. The upstream pipe and downstream pipe are captured by said at least one cylindrical section either frictionally or by use of stainless steel bands. The unitary removable barrier includes a planar disk molded as a unitary structure with said at least one cylindrical section which is characterized as being of circular circumference and which complete blocks the water line when in place. The planar disk has a diameter which is substantially perpendicular to the longitudinal axis created by the water line and which is further characterized as being capable of being punctured whereupon the planar disk allows for the passage of water from said upstream pipe to said downstream pipe. Means are provided therewith for puncturing said planar disk from a location exterior to the cylindrical water line.

DETAILED DESCRIPTION OF THE INVENTION

Figure 1:
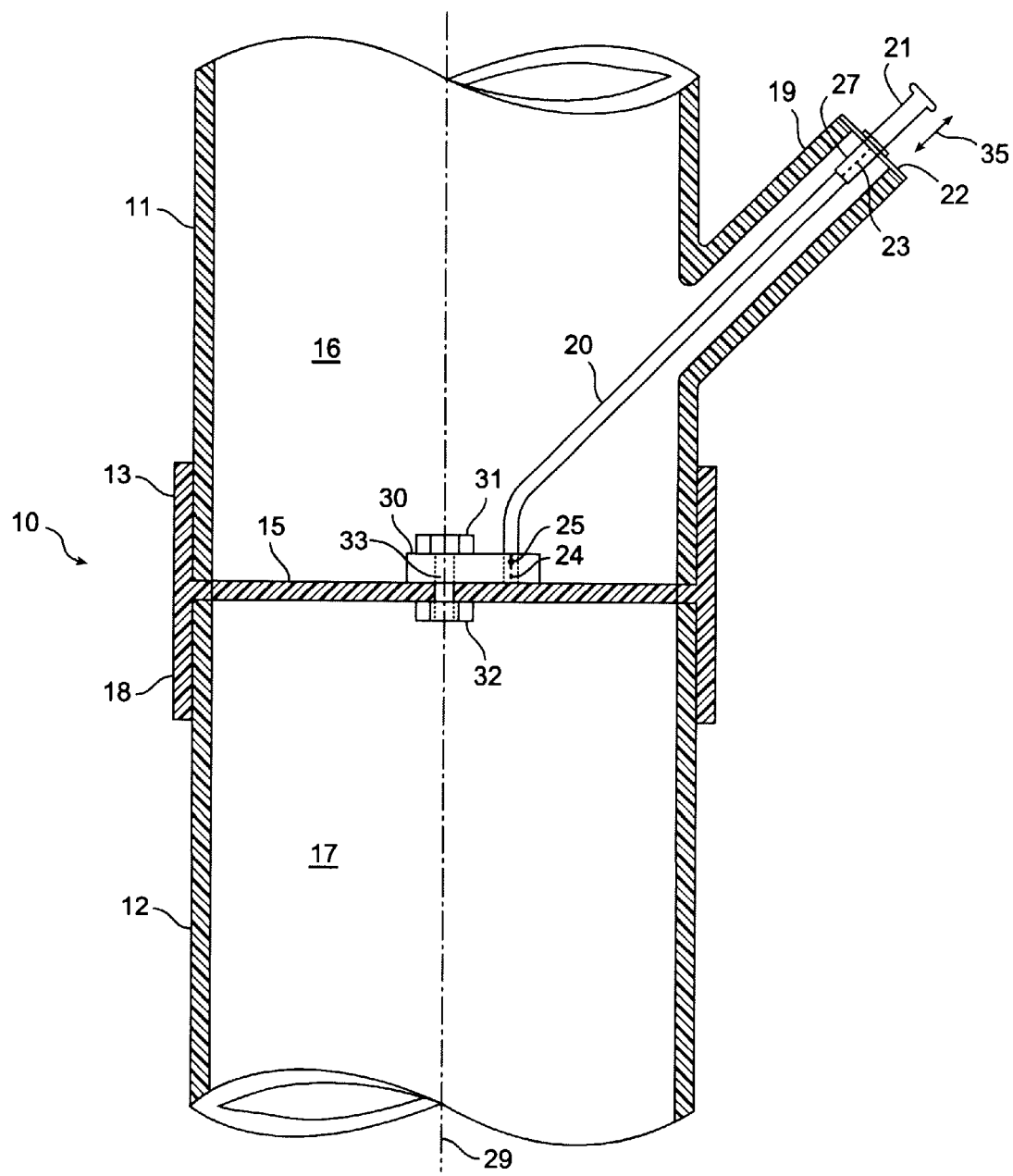
FIG. 1 is a depiction of the present invention installed in a suitable waste water line in partial cross-section.
Figure 2:
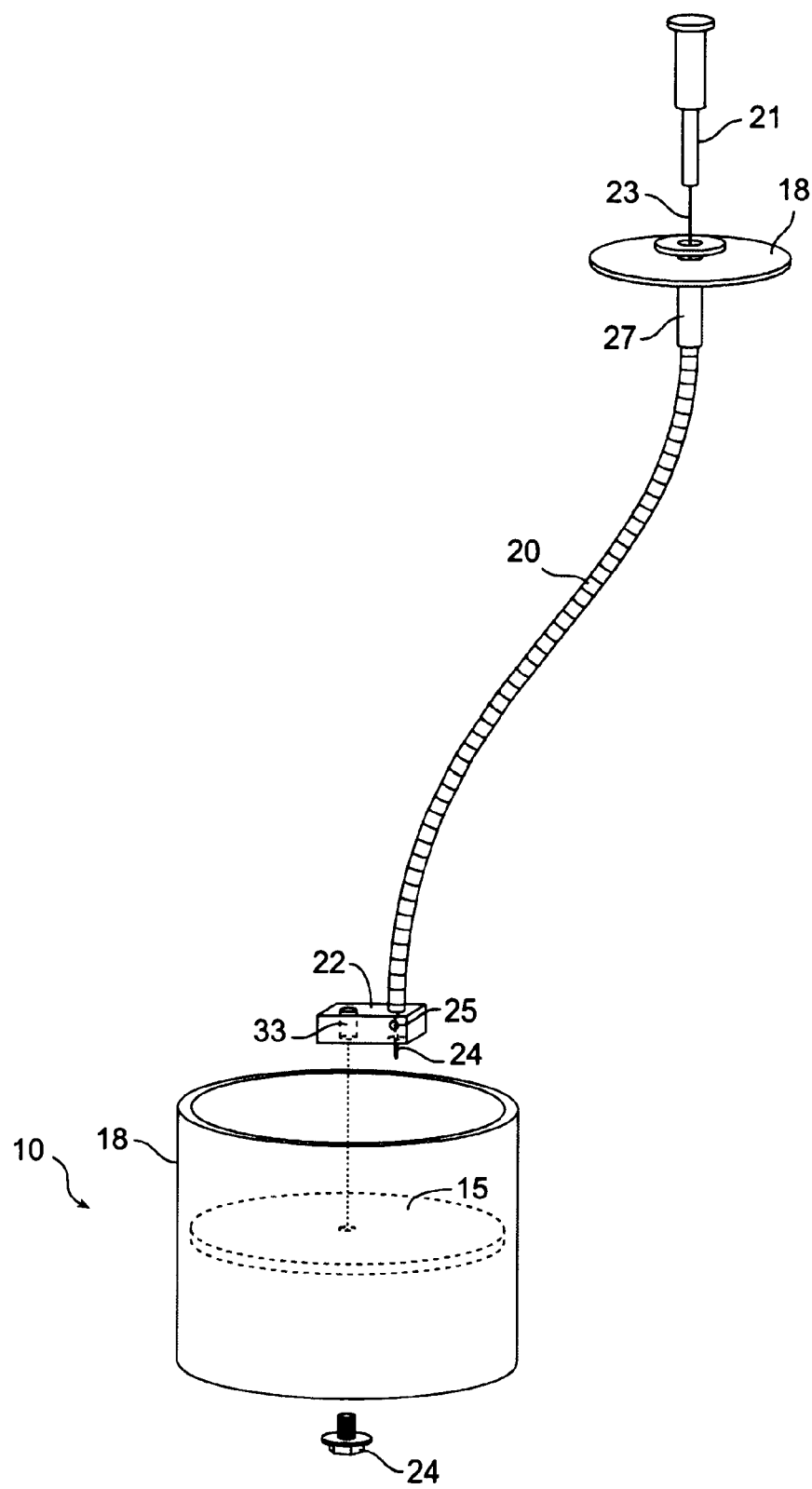
FIG. 2 is a perspective view of the present invention removed from a waste water line.

Turning first to FIG. 1, unitary removable barrier 10 is depicted as installed in a cylindrical water line composed of upstream pipe 11 and downstream pipe 12 creating upstream area 16 and downstream area 17 separated by planar disk 15 as part of the unitary removable barrier 10. The cylindrical water line made up of upstream cylindrical pipe 11 and downstream cylindrical pipe 12 is intended to receive water from a house, building or other source and to direct it to a municipal sewer system or similar collection site.

Removable barrier 10 is composed of a single piece body having at least one cylindrical section 18 having at least one cross-sectional area defined by regions 16 and 17. The at least one cylindrical section 18 is further provided with longitudinal axis 29 which coincides with the longitudinal axis of the waste line defined by pipes 11 and 12. The at least one cylindrical section 18 is further sized to receive upstream pipe 16 and downstream pipe 17 usually as a friction fit or through the use of metal bands employed to tighten said at least one cross-sectional area 18 about the periphery of pipes 11 and 12 to create a water tight fit.

Planar disk 15 is located within said at least one cylindrical section 18 and is characterized as being of circular circumference which completely blocks this cross-sectional area having a diameter which is substantially perpendicular to longitudinal axis 29 as shown.

When intact, planar disk 15 acts to block water flow from upstream pipe 11 to downstream pipe 12. When a suitable water test is being conducted, area 16 contains water and creates a pressure head upon planar disk 15 while area 17 remains substantially dry. This enables water to be backed up within suitable lines under test to determine leakage is being experienced. Once the test is complete, the integrity of planar disk 15 is not necessary or desirable as the water head created in area 16 is intended to be dissipated through area 17.

The present invention contemplates rupture of planar disk 15 by creating a puncture through planar disk 15. It has been determined when the pressure head created in area 16 is as anticipated, the creation of a puncture through planar disk 15 will cause rupture of planar disk 15 and its consequent inability to hold back the anticipated water head.

As noted in the figures which are appended, it is contemplated that planar disk 15 can be punctured by use of a mechanism located outside of the water line. In reference to FIG. 1, pipe wye or tee 19 is created within upstream pipe 11. The interior volume of wye or tee 19 can be isolated from the exterior of the water line through the use of fitted disk 22 as shown. Plunger 21 is capable of moving in the direction of arrow 35 which, in turn, moves wire 23 within jacket 20 both towards and away from planar disk 15.

Located atop planar disk 15 is securing block 30 which can be affixed to planar disk 15 through the use of bolt 31 and nut 32 passing within region 33. Jacket 20 can be fixedly secured to securing block 30 through the use of set screw 24. Wire 23 is sized and positioned to remain adjacent the upstream side of planar disk 15 noting that, to facilitate puncture, wire 21 can be provided with sharpened tip 24. Upon actuation of plunger 21 towards disk 22, wire 23 at sharpened end 24 is caused to puncture planar disk 15, again, destroying its integrity in maintaining water within region 16 from proceeding to region 17. Once punctured and removed, it is anticipated that a suitable pressure head will exist within region 16 to rupture planar disk 15 as suggested herein.

I claim:

1. A unitary removable barrier for installation in a cylindrical water line to selectively block the water line to passage of water therethrough, said unitary removable barrier being composed of a single piece body having at least one cylindrical section having at least one cross-sectional area, longitudinal axis and sized to receive an upstream pipe and downstream pipe of said water line, and a planar disk located within said at least one cylindrical section and which is characterized as being of circular circumference which completely blocks said cross-sectional area, having a diameter which is substantially perpendicular to said longitudinal axis and which, when intact, blocks water flow from said upstream pipe to said downstream pipe but which is capable of being punctured whereupon said planar disk allows for the passage of water from said upstream pipe to said downstream pipe and means provided therewith for puncturing said planar disk from a location exterior to said cylindrical water line, said means for puncturing said planar disk comprises a jacket and wire, said jacket and wire having a first end terminating at said planar disk and a second end terminating outside of said cylindrical water line.

2. The unitary removable barrier of claim 1 wherein said wire is sized and positioned such that as said wire is caused to controllably move with respect to said jacket at said second end, said wire is caused to puncture said planar disk at said first end.

3. The unitary removable barrier of claim 2 wherein said jacket is fixedly positioned adjacent said planar disk at its first end by securing said jacket at its first end to a mounting block affixed to said planar disk.

4. The unitary jacket of claim 2 wherein said wire is affixed to a plunger at its second end, said plunger being movable with respect to said jacket.

5. The unitary removable barrier of claim 2 wherein said wire is characterized as having a sharpened tip at its first end to facilitate the puncturing of said planar disk.

6. The unitary removable barrier of claim 2 wherein said planar disk is capable of rupturing once punctured by said wire.

* * * * *

UNITED STATES PATENT AND TRADEMARK OFFICE
CERTIFICATE OF CORRECTION

PATENT NO. : 6,755,215 B2  Page 1 of 1
APPLICATION NO. : 09/992806
DATED : June 29, 2004
INVENTOR(S) : Duncan It is certified that error appears in the above-identified patent and that said Letters Patent is hereby corrected as shown below:

Cover page, insert item --(73) Assignee: MCP Industries, Inc.--

Signed and Sealed this

Sixteenth Day of March, 2010

David J. Kappos
*Director of the United States Patent and Trademark Office*